United States Patent
Baik et al.

[19]

[11] Patent Number: 6,046,812
[45] Date of Patent: Apr. 4, 2000

[54] SHAPE-MEASURING LASER APPARATUS USING ANISOTROPIC MAGNIFICATION OPTICS

[75] Inventors: Sung-Hoon Baik; Seung-Kyu Park; Cheol-Jung Kim, all of Taejon, Rep. of Korea

[73] Assignees: Korea Atomic Energy Research Institute, Daejeon; Korea Electric Power Corporation, Seoul, both of Rep. of Korea

[21] Appl. No.: 09/166,418

[22] Filed: Oct. 5, 1998

Related U.S. Application Data

[63] Continuation-in-part of application No. 08/937,949, Sep. 25, 1997, abandoned.

[30] Foreign Application Priority Data

May 29, 1997 [KR] Rep. of Korea ...................... 97/21760

[51] Int. Cl.[7] .................................................. G01B 11/24
[52] U.S. Cl. ...................................... 356/376; 250/559.23
[58] Field of Search ...................................... 356/376, 371; 250/559.22, 559.23; 382/108, 154

[56] References Cited

U.S. PATENT DOCUMENTS

| 4,634,279 | 1/1987 | Ross et al. | 356/376 |
| 5,129,010 | 7/1992 | Higuchi et al. | 382/8 |
| 5,193,120 | 3/1993 | Gamache et al. | 382/1 |
| 5,589,941 | 12/1996 | Sabater et al. | 356/376 |
| 5,621,814 | 4/1997 | Honda | 356/376 |

*Primary Examiner*—F. L. Evans
*Attorney, Agent, or Firm*—Dilworth & Barrese

[57] ABSTRACT

The present invention relates to an apparatus for measuring surface relief profile of an object by projecting a line-shaped laser sheet beam in triangulation method and anisotropic magnification optics for improving the measurement resolution. The purpose of the present invention is to provide a system or an apparatus capable of measuring relief profiles with anisotropic magnification optics composed with one or more positive and one or more negative cylindrical lenses, which allows it to obtain magnified images along the direction vertical to the length-wise direction of the image of a line-shaped laser sheet beam for higher resolution in the relief profile measurements along the direction parallel to the length-wise direction of a line-shaped laser sheet beam image to measure the same range of area as the range without anisotropic magnification optics.

4 Claims, 5 Drawing Sheets

SHAPE-MEASURING LASER APPARATUS USING ANISOTROPIC MAGNIFICATION OPTICS

This is a continuation-in-part of application Ser. No. 08/937,949 dated Sep. 25, 1997, now abandoned.

FIELD OF THE INVENTION

The present invention relates to a non-contact shape-measuring laser apparatus. More particularly, the present invention is concerned with a shape-measuring laser apparatus with anisotropic magnification optics for improving measurement resolution using optical triangulation with a projected line-shaped laser sheet beam.

BACKGROUND OF THE INVENTION

It is often desirable to measure the shape or range of an object in digital data with an automatic system. The shape measuring of an object involves measuring the relative position of points which form the surface of the object. The art of measuring relief profiles with the optical method is a non-contact measurement and so does not affect the target. Parallel and high-resolution measurements are possible in this art.

Many kind of range sensors are often used for this purpose and the most common sensors use optical triangulation method to determine range. The triangulation method using a line-shaped laser sheet beam is practical due to the high-resolution and the high speed.

A conventional shape-measuring system using a line-shaped laser sheet beam is shown in FIG. 1. The system involves a line-shaped laser sheet beam on the surface of an object using a projector 1 consisting of a laser source and sheet beam generating optics and a camera 5 with an acute angle away from the line-shaped laser sheet beam to capture the deformed image of the line-shaped laser sheet beam. The method of measuring relief profiles involves the analysis of the above image with an image processing board 6 or a computer 7.

As shown in FIG. 2, when the surface of an object is not flat, the image of a line-shaped laser sheet beam is shifted in the direction vertical to the base line which is formed by the image of a line-shaped laser sheet beam projected on the reference flat area. Then, the vertical shift has the altitude-information of that point on the object surface. The shape-measuring, therefore, involves capturing the above image with a camera and then extracting the three-dimensional(3-D) information of the shape. The three-dimensional information over the whole surface of the object, however, is obtained by moving the target or scanning the line-shaped laser sheet beam.

Practically, the optical triangulation method with line-shaped laser sheet beam is most often utilized because of simplicity, high-resolution and high-speed. There are many prior patents which relate to the above shape-measuring apparatus, for example, U.S. Pat. No. 4,653,104 and U.S. Pat. No. 5,129,010.

The measurement resolution of this apparatus is limited by the finite number of CCD arrays the camera. To improve the resolution, the camera must be able to resolve small vertical shift of the line-shaped laser sheet beam. This generally requires high magnification in the direction of vertical shift. But, the high magnification with a conventional CCD camera lens cause to narrow the measuring range along the direction parallel to the length-wise direction of the image of line-shaped laser sheet beam.

As another method to improve the resolution, the image of an object can be digitally magnified only to the direction of vertical shift. The maximum image size along the direction of vertical shift is limited only by the maximum relief profile height. The measuring range along the direction parallel to the length-wise direction of the image of line-shaped laser sheet beam is not changed. In this case, the interpolation of magnified image is used to get the sub-pixel resolution of unmagnified image. However, this approach has a drawback in the long processing time for the interpolation of the image.

In the present invention, anisotropic magnification optics composed with one or more positive and one or more negative cylindrical lenses are used to obtain magnified images along the direction vertical to the length-wise direction of the image of a line-shaped laser sheet beam for higher measurement resolution, and non-magnified images along the direction parallel to the length-wise direction of the line-shaped image of laser sheet beam to measure the same range of area as the range without anisotropic magnification optics. Furthermore, in this invention, the anisotropic magnification can be varied by moving the positions of a positive and a negative cylindrical lenses and varying the interval between the cylindrical lenses while keeping the images in both width-wise and length-wise directions in focus.

There are similar prior inventions of optical triangulation system using an anamorphic optical system. For example, U.S. Pat. No. 5,621,814 by Honda suggests a method of inspecting height apparatus with a cylindrical lens and slit beams. But anamorphic optics with a cylindrical lens can image only one direction, therefore, anamorphic image of the line-shaped laser sheet beam by a cylindrical lens and a conventional camera lens has de-focused image blur through one-direction which degrade measurement resolution. U.S. Pat. No. 4,872,747 suggests optical systems with anamorphic prisms for use with laser triangulation optical sensor systems to improve measurement resolution.

SUMMARY OF THE INVENTION

One of the purposes of the present invention is to provide a system or an apparatus capable of measuring relief profiles using a line-shaped laser sheet beam with anisotropic magnification optics composed with one or more positive and one or more negative cylindrical lenses, which allows it to obtain magnified images along the direction vertical to the length-wise direction of the image of a line-shaped laser sheet beam for higher resolution in the relief profile measurements and non-magnified images along the direction parallel to the length-wise direction of the line-shaped image of laser sheet beam to measure the same range of area as the range without anisotropic magnification optics. The anisotropic magnification ratio can be varied by moving the positions of a positive and a negative cylindrical lenses and varying the interval between the cylindrical lenses while keeping the images of both directions in focus.

Another purpose of the present invention is to decrease the processing time for shape measurement because the present invention does not need a software interpolation process to obtain a higher sub-pixel resolution.

Figure 5A:
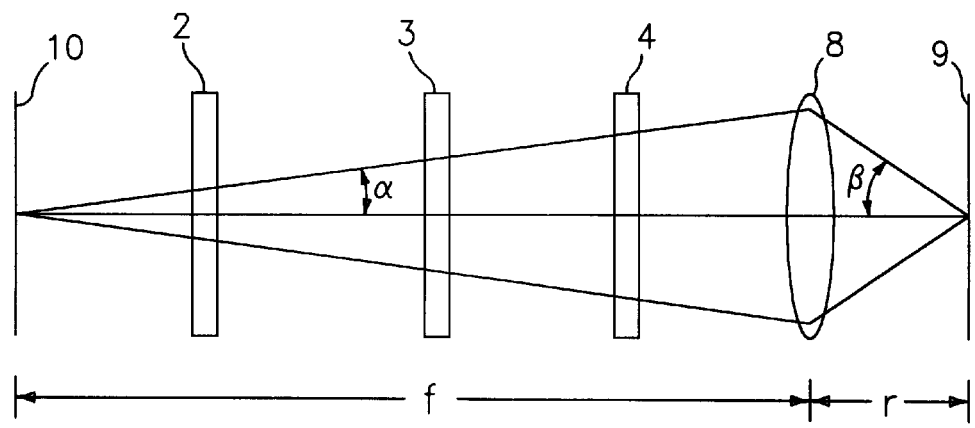
FIG. 5 shows anisotropic magnification optics with two cylindrical lenses.

(a) The optical ray tracing showing the image formation in the plane which includes the cylindrical axes of cylindrical lenses (b) The optical ray tracing showing the image formation in the plane vertical to the plane shown in FIG. 5a.

Figure 6:
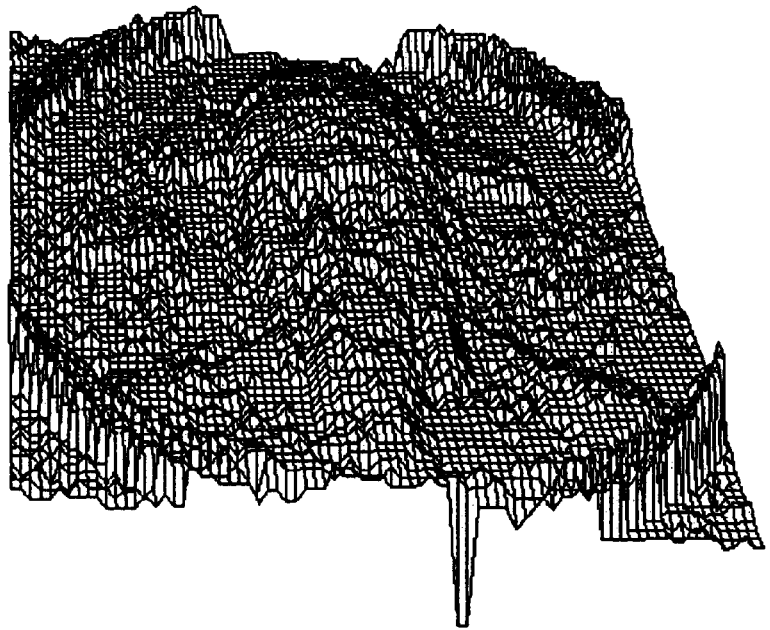

FIG. 6 shows the result of conventional unmagnified shape-measurement with a pixel resolution.

Figure 7:
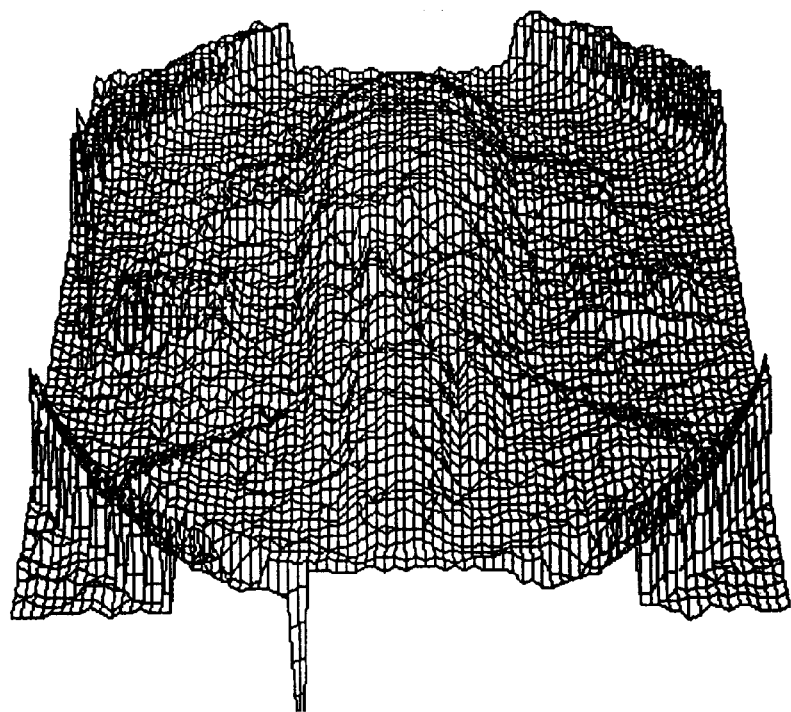

FIG. 7 shows the result of shape-measurement with improved sub-pixel resolution obtained by the digital magnification and interpolation process.

Figure 8:
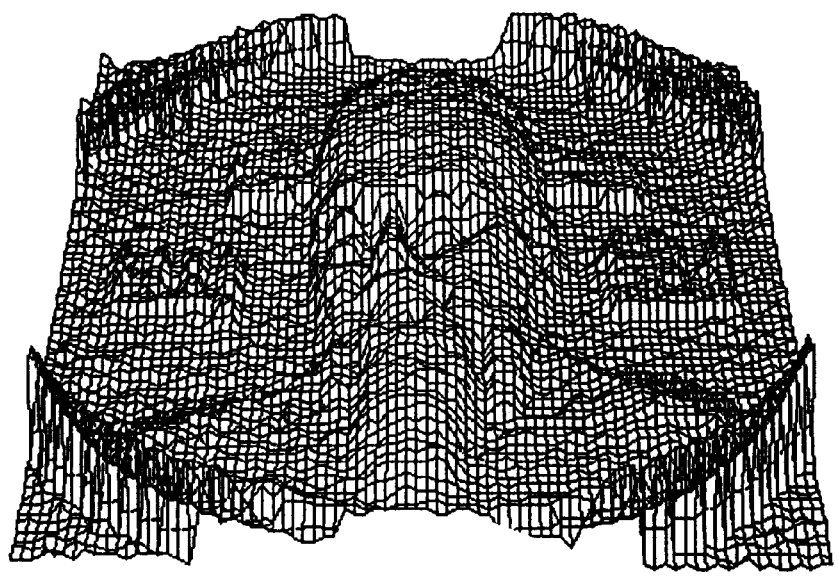

FIG. 8 shows the result of shape-measurement with improved sub-pixel resolution obtained by the anisotropic magnification optics of the present invention.

DESCRIPTION OF THE INVENTION

Figure 1:
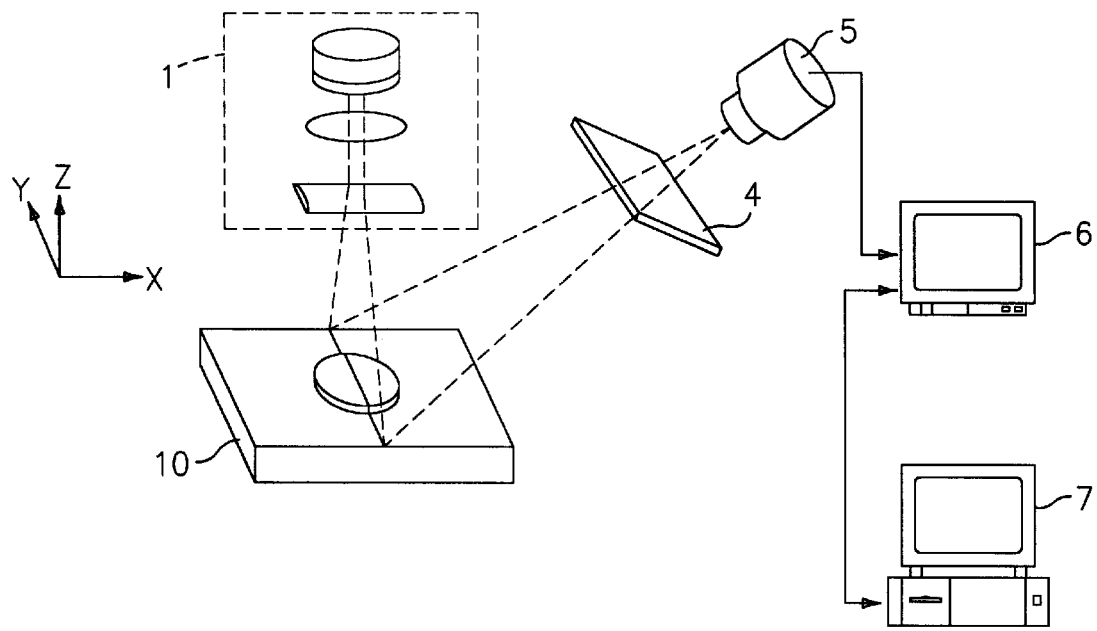
FIG. 1 shows the geometry of a conventional shape-measuring laser apparatus.(Prior Art)
Figure 2:
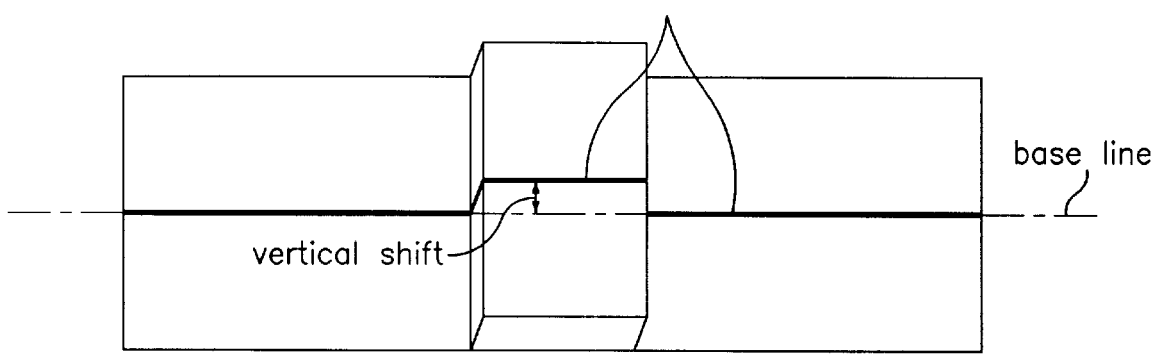
FIG. 2 illustrates an exemplary pattern of the shifted image of a line-shaped laser sheet beam viewed at an angle away from the direction of projection
Figure 3:
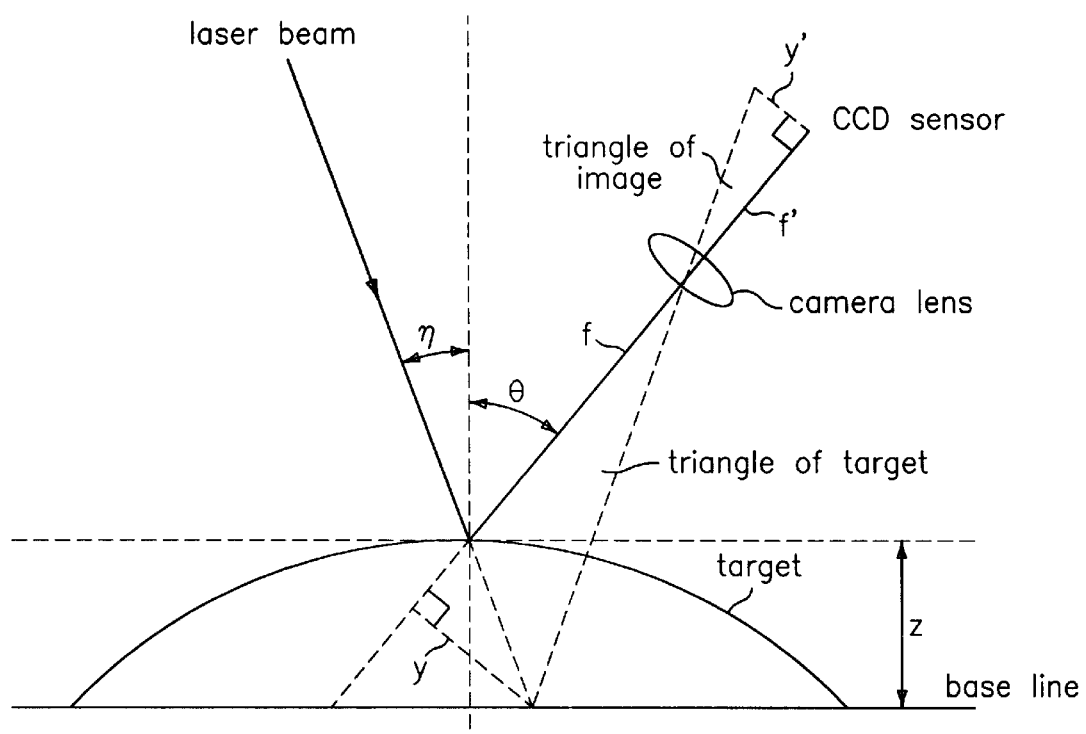
FIG. 3 illustrates the principle of triangulation with a line-shaped laser sheet beam.

The principle of optical triangulation is described below. As shown in FIG. 3, the known variables are the incidence angle $\eta$ of the laser, the angle $\theta$ of the CCD camera, and the magnifying power m(m=f'/f). A variable y' of the "triangle of image" has the altitude-information which is extracted from the captured image in the CCD camera. The altitude-information (y') of the triangle of image relates to the relative altitude-information from the reference line of the "triangle of target", as seen in the following equation:

$$y = m \frac{\sin(\eta + \theta)z}{\cos(\eta) + (z/f)\cos(\eta + \theta)} \quad (1)$$

In equation (1), the measuring-value y' is not linear to the height value z of the target object. But, since the height of the object is much less than the distance f from the lens to the object, the equation (1) can be approximated as follows.

$$y = m \frac{\sin(\eta + \theta)}{\cos(\eta)} z \quad (2)$$

In equation (2), because m, $\eta$ or $\theta$ is a geometrically determined quantity, y' is linear to z. In general, because the term z/f is much smaller than the term cos($\eta$), equation (2) is more often used than equation (1) in most adaptations.

Therefore, the resolution of shape measurement is determined by the altitude of the object corresponding to the pixel size ($\Delta$y')of the CCD camera, as seen in the following equation.

$$\Delta z = \frac{\cos(\eta)}{m \sin(\eta + \theta)} \Delta y \quad (3)$$

In equation (3), the angles $\eta$ and $\theta$, and the pixel size $\Delta$y', are fixed. When the target object is viewed with a large magnification, m, of the CCD camera, the height measurement resolution, $\Delta Z$, corresponding to one pixel becomes smaller and the height measurement resolution gets better. However, as the magnification, m, is made larger, the range viewed by the camera becomes narrower. This signifies that the measuring area of the object is getting smaller.

Another method of improving the resolution is to enlarge the declining angle, $\theta$, of the camera. However, as $\theta$ increases, a part of the shape information is lost because of the shadow effect on the rough surface of an object, resulting in significant errors. Improving the resolution by increasing $\theta$, therefore, has a limit.

The present invention was, therefore, invented to maintain the same range of measurement while at the same time to improve the resolution without increasing the angle $\theta$. That is, the present invention magnifies an image only in the direction vertical to the length-wise direction of the image of a line-shaped laser sheet beam which is the same direction to measure the y' for the extraction of the height information of an object while preventing magnification in the direction parallel to the length-wise direction of the image of a line-shaped laser sheet beam because magnification in the parallel direction limits the measuring range in the parallel direction.

Figure 4:
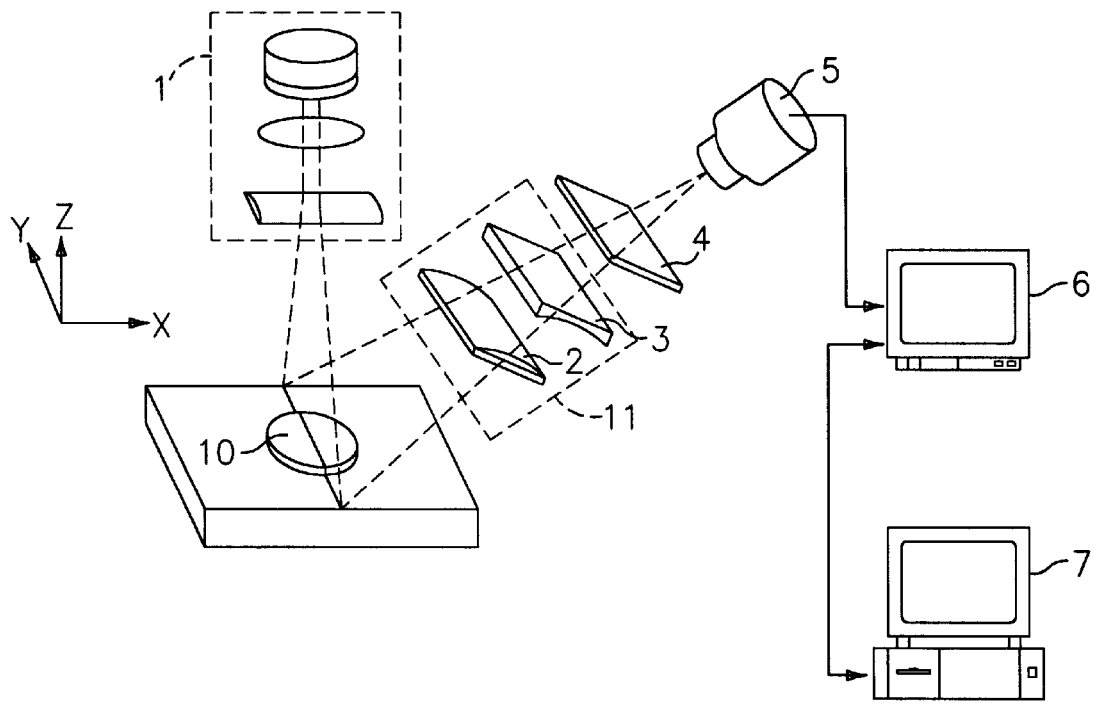
FIG. 4 shows shape-measuring laser apparatus according to an embodiment of the present invention.

A shape measuring laser apparatus according to an embodiment of the present invention is shown in FIG. 4. The apparatus comprises of:

a laser source 1 projecting a line-shaped laser sheet beam on an object;

an anisotropic magnification optics 11, which magnifies an image at higher magnification in the direction vertical to the length-wise direction of the image of a line-shaped laser sheet beam than in the direction parallel to the length-wise direction of the image of a line-shaped laser sheet beam by aligning the cylindrical axes of the positive and negative cylindrical lenses parallel to the length-wise direction of the image of a line-shaped laser sheet beam;

a camera 5 which captures the image;

an image processing board 6, which stores the captured image in a memory and then traces the centroid of the projected image of line-shaped laser sheet beam so as to extract 3-D image-information; and a computer 7 which executes image-process programs.

The anisotropic magnification optics 11 is further comprised of one or more positive-cylindrical lenses 2, and one or more negative-cylindrical lenses 3, so that the image formed on the sensor plane 9 of the camera 5 is magnified at higher magnification in the direction vertical to the length-wise direction of the image of a projected line-shaped laser sheet beam than in the direction parallel to the length-wise direction of the image of a projected line-shaped laser sheet beam.

At this point, as the focal lengths of the cylindrical lenses and the interval between the cylindrical lenses used in the anisotropic magnification optics 11 are varied, the anisotropic magnifying-power of the laser image can be controlled. Especially, for a given positive and a negative cylindrical pair, the anisotropic magnification can be varied the same way as a conventional zoom lens varies the magnification keeping the same focus position.

Also, in FIG. 5, the above anisotropic optical magnifying means 11 is placed in front of a standard spherical camera lens 8, but they may also be placed behind it.

The image of a line-shaped laser sheet beam on the object 10 is captured clearly in the sensor plane 9 of the CCD camera 5 through a color-filter 4 which has higher transmission at the laser wavelength. The image on the above CCD camera 5 is captured and processed using image processing board 6 or a computer 7.

FIG. 5 shows an exemplary procedure for obtaining anisotropic magnified image utilizing a positive cylindrical lens 2 and a negative cylindrical lens 3. The optical ray trace in the plane which includes the cylindrical axes of a positive cylindrical lens 2 and a negative cylindrical lens 3 and includes the optical axis of a standard spherical camera lens 8 is shown in FIG. 5a where the color filter 4 is also shown. Both the positive and negative cylindrical lenses have no power in this plane and the magnification ($M_1$) in this plane is determined only by a standard spherical camera lens 8.(magnification of image $M_1=\alpha/\beta$, total length between the object and the image $L_1=f+r$)

Figure 5B:
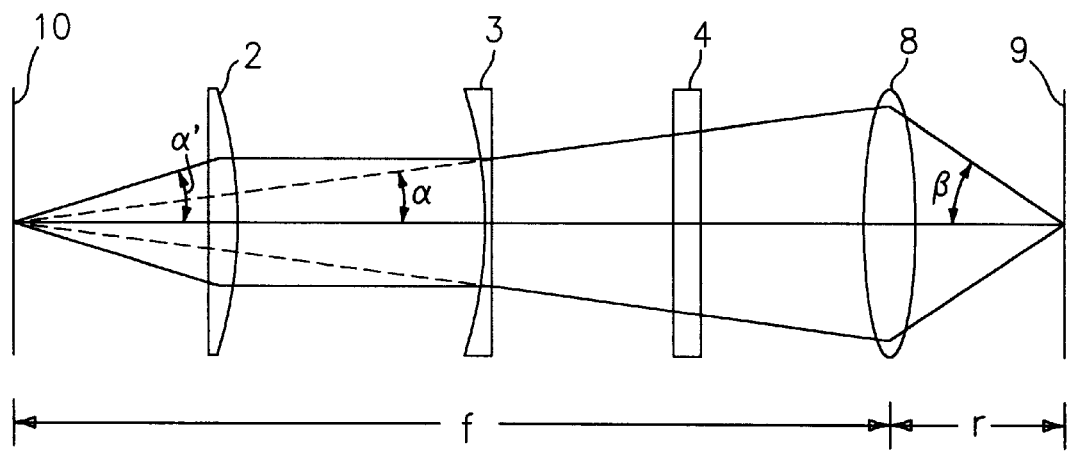

However, in the plane shown in FIG. 5b which is vertical to the plane shown in FIG. 5a and includes the optical axis of a standard spherical camera lens 8, both the positive and negative cylindrical lenses have power to bend the optical ray to get the higher magnification ($M_2$) compared to the magnification obtained only by a standard spherical camera lens 8 ($M_1$) shown in FIG. 5a. The anisotropic magnification (M) introduced by a positive cylindrical lens 2 and a negative cylindrical lens 3 is shown in FIG. 5b (magnification of image $M_2=\alpha'/\beta$, total length between the object and the image $L_2=f+r$, anisotropic magnification introduced by the cylindrical lenses $M=M_2/M_1=\alpha'/\alpha$)

By using anisotropic magnification optics in connection with a laser triangulation apparatus, we improve the measurement resolution by enlarging the magnification only in the direction vertical to the length-wise direction of the image of a line-shaped laser sheet beam to get higher sub-pixel resolution while maintaining the same magnification in the direction parallel to the length-wise direction of the image of a line-shaped laser sheet beam to keep the same measuring range in this direction over an object.

A preferred embodiment of the present invention is constructed below and the results are compared with those from the conventional procedures.

An image processing board with 2M byte memory buffer and a basic library, is used for image processing. The CCD camera output is connected to input channel of the board and library functions supported by the board are utilized in real-time or in quasi real-time processing to transfer shape-information from the step of image-capturing to the step of extracting central-lines. In the final step, the central processing unit of a personal computer 7 performs the functions of recording the location of the central-line in memory and of reconstructing the three-dimensional image afterwards.

FIG. 6, FIG. 7 and FIG. 8 show results of shape measurements of a 100-won Korean coin, obtained by the above hardware apparatus and signal-processing software. In this experiment, a 100 mm focal length positive cylindrical lens and a 250 mm focal length negative cylindrical lens are used to get the anisotropic magnification of 2.5 and to improve the resolution by factor of 2.5.

FIG. 6 shows the results of the shape of a 100-won coin by a conventional triangulation method and FIG. 7 is the shape output obtained by the cubic B spline interpolation using digital image magnification. The magnification of 4 only vertical to the length-wise direction of the image of a line-shaped laser sheet beam is used in digital image magnification. Although, the resolution is improved in digital magnification, a relatively long processing time is required.

However, FIG. 8 shows the results of using optical anisotropic magnification according to an embodiment of the present invention. The method resulted in improving the resolution by 2.5 times without any additional processing time required.

What is claimed is:

1. In a three dimensional shape measuring apparatus having a projector (1) projecting a line-shaped laser sheet beam on an object (10), imaging optics arranged to image the line-shaped laser sheet beam on an object to an imaging sensor in a camera (5) and located between the object (10) and camera (5), an image processing board (6) which stores captured images for generating a binary image and exacts a central line of a binary image file, and a computer (7) which calculates the height information along the image of a line-shaped laser sheet beam and reconstructs the three dimension shape of an object, the imaging optics comprising anisotropic magnification means (11), a color filter (4) which has narrow bandwidth and can transmit the line-shaped laser sheet beam, and a standard spherical camera lens (8), wherein the anisotropic magnification means (11) is composed of one or more positive cylindrical lenses (2) and negative cylindrical lenses (3) located in front of the camera (5), and cylindrical axes of all the cylindrical lenses (2,3) are aligned parallel to the length-wise direction of the image of a line-shaped laser sheet beam and vertical to the optical axis of the standard spherical camera lens (8), to obtain an anisotropic magnification between the length-wise direction and the width-wise direction of the image of a line-shaped laser sheet beam while keeping the focus in both directions.

2. The apparatus as claimed in claim 1 wherein location of anisotropic magnification means (11) can be either in front of the standard spherical camera lens (8) or behind it.

3. The appropriate as claimed in claim 1, wherein focal lengths of the cylindrical lenses (2,3) in said anisotropic magnification means (11) are varied to adjust the anisotropic magnification.

4. The apparatus as claimed in claim 1, wherein position of positive and negative cylindrical lenses (2,3) in said anisotropic magnification means (ii) is adjustable to vary the anistropic magnification with the same cylindrical lenses (2,3) while keeping the same focus during movement.

* * * * *